(12) United States Patent
James et al.

(10) Patent No.: US 11,118,071 B2
(45) Date of Patent: Sep. 14, 2021

(54) MULTI-FUNCTIONAL ADDITIVE FOR MAR AND SCRATCH RESISTANCE IN CHEMICAL COATING COMPOSITIONS

(71) Applicant: PISON STREAM SOLUTIONS INC., Brecksville, OH (US)

(72) Inventors: Joseph H. James, New York, NY (US); Subadhra Janardhanan, Brecksville, OH (US); Sanjana Das, New York, NY (US); Kathleen McAfee, Brecksville, OH (US)

(73) Assignee: PISON STREAM SOLUTIONS INC., Brecksville, OH (US)

( * ) Notice: Subject to any disclaimer, the term of this patent is extended or adjusted under 35 U.S.C. 154(b) by 383 days.

(21) Appl. No.: 16/225,451

(22) Filed: Dec. 19, 2018

(65) Prior Publication Data

US 2020/0199375 A1 Jun. 25, 2020

(51) Int. Cl.
| | | |
|---|---|---|
| *C09D 5/00* | (2006.01) | |
| *C09D 5/03* | (2006.01) | |
| *C09D 7/48* | (2018.01) | |
| *C09D 7/40* | (2018.01) | |
| *C09D 7/61* | (2018.01) | |
| *C08L 67/00* | (2006.01) | |
| *C08L 33/08* | (2006.01) | |
| *C08L 63/00* | (2006.01) | |
| *C08K 3/36* | (2006.01) | |
| *C08K 3/40* | (2006.01) | |
| *C08K 5/544* | (2006.01) | |
| *C08K 5/09* | (2006.01) | |
| *C08K 9/12* | (2006.01) | |
| *C08G 18/80* | (2006.01) | |

(52) U.S. Cl.
CPC .............. *C09D 5/037* (2013.01); *C09D 7/48* (2018.01); *C09D 7/61* (2018.01); *C09D 7/69* (2018.01); *C08G 18/80* (2013.01); *C08K 3/36* (2013.01); *C08K 3/40* (2013.01); *C08K 5/09* (2013.01); *C08K 5/544* (2013.01); *C08K 9/12* (2013.01); *C08K 2201/005* (2013.01); *C08L 33/08* (2013.01); *C08L 63/00* (2013.01); *C08L 67/00* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 4,007,299 A | 2/1977 | Schulde et al. | |
| 5,098,955 A * | 3/1992 | Pettit, Jr. ............ | C09D 133/064 525/108 |
| 5,229,470 A | 7/1993 | Nozaki et al. | |
| 5,721,052 A | 2/1998 | Muthiah et al. | |
| 5,786,308 A | 7/1998 | Eicken et al. | |
| 5,997,944 A | 12/1999 | Schulte et al. | |
| 6,121,408 A | 9/2000 | Aoki et al. | |
| 6,825,258 B2 | 11/2004 | Steckel | |
| 6,905,778 B2 | 6/2005 | Tullos et al. | |
| 9,296,917 B2 | 3/2016 | Misev et al. | |
| 9,353,254 B1 * | 5/2016 | James .................. | C09D 123/06 |
| 9,469,768 B1 | 10/2016 | James | |
| 2001/0005735 A1 | 6/2001 | Ring et al. | |
| 2003/0055142 A1 | 3/2003 | Steckel | |
| 2003/0166758 A1 | 9/2003 | Barkac et al. | |
| 2003/0194560 A1 | 10/2003 | Spera et al. | |
| 2004/0157961 A1 | 8/2004 | Tullos et al. | |
| 2004/0254278 A1 | 12/2004 | Schieferstein et al. | |

OTHER PUBLICATIONS

Industrial Coatings Technical Data Sheet, Tinuvin 405. BASF Corporation, 2016, pp. 1-4, Rev. 3.
Printing & Packaging Industrial Coatings Technical Data Sheet, Tinuvin 400. BASF Corporation, 2016, pp. 1-3, Rev. 3.
Industrial Coatings Technical Data Sheet, Tinuvin 144. BASF Corporation, 2016, pp. 1-3, Rev. 3.
The Role of Additives in Powder Coatings, Paint & Coatings Industry. vol. 1, No. 1, 1999. Downloaded Dec. 4, 2018 from https://www.pcimag.com/articles/93753-the-role-of-additives-in-powder-coatings.
BASF Corp: E-Commerce-Product Selector. Downloaded Dec. 4, 2018 from https://worldaccount.basf.com/wa/NAFTA~en_US/ProductSearch/Global.

* cited by examiner

*Primary Examiner* — Stefanie J Cohen
(74) *Attorney, Agent, or Firm* — Duane Morris LLP

(57) ABSTRACT

A mar and scratch resistant additive that possesses multi-functional and other characteristics is described. The additive comprises a binder system platform that is easily introduced into a wide range of chemical coating platforms. The additive may also be introduced to these coatings by way of a silica carrier to simplify its use.

12 Claims, No Drawings

MULTI-FUNCTIONAL ADDITIVE FOR MAR AND SCRATCH RESISTANCE IN CHEMICAL COATING COMPOSITIONS

FIELD AND BACKGROUND OF INVENTION

The invention relates to additives for chemical coating compositions and, more specifically, to an additive to provide improved mar and scratch resistance to films formed by powder and liquid coating formulations.

Powder coating compositions are dry, free-flowing powders. In use, these powders are applied to a substrate (e.g., electrostatic spraying, fluidized bed coating, and/or hot flocking), which is then heated. This added energy causes the powder to melt, flow, and fuse into a continuous film. Advantageously, this procedure results in a robust film with good adhesion, while effectively eliminating the need to rely upon solvents (and particularly volatile organic compounds).

Generally speaking, powder compositions are primarily composed of polyurethanes, polyester, polyethylene, and epoxy, as well as various combinations thereof (e.g., epoxy-polyester, urethane-polyester, etc.), as base resin(s). Polyisocyanates, tryiglycidylisocyanurate (TGIC) and TGIC-free curatives may be included, and other additives, such as flow control agents, hardeners, catalysts, fillers, gloss control agents, pigments, and charge inhibitors may also be incorporated to enhance the characteristics of the blend as it is mixed, applied, and/or fused. In operation, the resins melt and fuse together, while the additives facilitate various underlying attributes during or after fusion, all with the goal of creating a chemically non-reactive, durable, and continuous coating wherever the composition is applied to the substrate. In some instances, the formulation may be created to allow the composition to be used as a solid, dry powder or, by suspending or otherwise mixing that powder with a liquid carrier, in a liquid form.

Conventional formulations often rely on additives to impart a specific function to the coating composition, such as wetting, flow characteristics (e.g., viscosity, etc.), surface hardness, or other traits. In these prior art compositions, a separate coating additive was required to impart just one of these functions, with the additive usually becoming effective upon curing within the composition during application. Prior to the invention disclosed below, multi-functional additives (i.e., one additive that was able to deliver several different characteristics/functions) were not believed to be feasible.

Because the base resins create the bulk of final chemical coatings (whether powder or liquid), it is generally thought to be desirable to maximize the amount of resin. In contrast, and especially to the extent that additives typically cost more and/or present unique formulation challenges in comparison to the base resins, additives tend to be used in their purest possible form but at the lowest possible levels while still delivering the desired attributes.

One particular problem during fusion or curing of a coating formulation is the inability to withstand mechanical actions such as rubbing, scraping or erosion. In particular these mechanical actions can create irregularities that could weaken the coating film, making it more susceptible to marring and/or scratching and reduce shelf-life of the system.

It is thought that increasing mar/scratch resistance and surface slip should improve taber abrasion and, by extension, increase weathering resistance. In turn, thicker coatings have been proposed as one means to guard against mar and scratch formation. Of course, these proposals are somewhat inter-related insofar as thicker coatings could exacerbate surface tension and flow issues.

One approach means to address the inability to withstand mechanical action is through the use of additives for mar/scratch resistance, such as homopolymers and copolymers of polyacrylates (e.g., esters of methacrylic and acrylic acids). Such additives can be provided in master batch dispersed on silica particles at an active level of up to 65 wt. % in the additive (or about 1.0 wt. % of the total composition), although additional additives may be required.

U.S. Pat. No. 9,353,254, which is incorporated by reference, describes a powder coating flow aid relying on a polyethylene resin combined with a polyester hydroxyl resin. A polymeric curative, degassing agent, ricinoleic acid (i.e., 12-hydroxy-9-cis-octadecenoic acid), and glass flake are also used, and the flow aid is introduced to powder coating compositions by way of a silica carrier. The polyethylene is provided at between 3.1 to 9.5 wt. %, the polyester hydroxyl at 35 to 50 wt. %, the polymeric curative at 5.0 to 10 wt. %, the degassing agent at 0.25 to 2.0 wt. %, the ricinoleic acid at 0.5 to 3.0 wt. %, glass flakes at 20 to 50 wt. %, and the silica carrier being 0.5 to 5.0 wt. % of the flow aid's total weight.

Additives specifically formulated to impart mar/scratch resistance are known. Representative examples include LANCO 1920 MF, PowderAdd 9078 (Lubrizol), SBS-1215 Wax (Estron Chemicals), and CERAFLOUR-950, CERAFLOUR-997 from BYK. Generally speaking, these additives are polymeric in nature, specifically including polyolefin, polyethylene, and/or polypropylene waxes—some of which may be micronized and/or further modified by polytetrafluoroethylene (PTFE).

Other approaches include increasing extruder temperature and mix times and increasing the amount of additives. Absent the use of specific additives for mar/scratch resistance, the most prevalent means to address this defect is to increase or decrease the film build or thickness.

Unfortunately, some of these non-additive solutions are not satisfactory because they result in another undesired side effect known as "edge pulling." Edge pulling is a condition in which the coating pulls away from the corners of the coated substrate resulting in incomplete formation of the finish.

The additive solutions add cost owing to their reliance on various additional substances. Further, these additives may not be compatible with all coating platforms, and properly incorporating or introducing the additive into the formulation can present it own challenges. For example, the additive must provide in acceptable performance on the Hegman-type gage tests (e.g., ASTM D1210), which measures the fineness of dispersion of pigment vehicle systems, in order to be incorporated into liquid-based platforms.

Another issue with respect to additives, and particularly additives for mar/scratch resistance, is that they generally serve only one purpose—to address the aforementioned issues with respect to the inability to withstand mechanical action. Thus, the mass/volume dedicated within the overall composition to this single issue means lost opportunities to maximize the formulation in other respects.

The efficacy of a coating additive for mar and scratch resistance can be measured by ASTM D7187, G171, and/or D7027. The distinctness of image (DOI) testing for gloss coated surfaces can be measured according to ASTM D5767, while specular gloss is measured by ASTM D523.

Ultimately, articles with insufficient coating integrity can be marred and scratched, which often results in rejection of the coated article. In the same manner, the presence of orange peel, edge pulling, and/or other anomalies which also leads to rejections. In all cases, these rejections result in discarding of the coated articles and/or costly reworking of the articles.

In view of the foregoing, a cost effective additive addressing all of these concerns would be welcome. Further, an additive for mar/scratch resistance that served multiple purposes—including some of the other additive functions identified above—would be particularly helpful, especially to the extent such an additive could also impart multi-functionality to the proposed coating composition.

SUMMARY OF INVENTION

A multi-functional additive that improves the mar and scratch resistance of the final, cured coating is contemplated. This additive also delivers ancillary benefits with respect to reduced friction, minimal loss of gloss and haze formation, and negligible reduction in distinctness of image (DOI) testing. The additive is made in two steps, relying on a masterbatch composition that is subsequently combined with certain catalysts, flow modifiers, curatives, and degassing agent. This combination is again extruded, ground and optionally introduced to conventional powder coating platforms at about 0.5 to 1.5 wt. % of the total combination. In some embodiments, the additive may be introduced to the conventional coating platform by way of (3-aminopropyl) trimethoxysilane (TMS) and/or other silica carriers (e.g., silicon dioxide at 45 to 55% active levels).

While the additive appears as if it could serve as a powder coating composition in its own right, the inventors have discovered that the additive formulation enables its use in a wide range of different coating platforms without the need for other additives for mar/scratch resistance. Further, the additive for mar/scratch resistance itself is not formulated to be—and, in numerous embodiments, simply cannot serve as—a distinct, stand-alone coating composition. For example, a preferred curative is not capable of adequately curing or hardening the resins in the additive. Multiple resins and/or other optional additives, including hardeners, tetramethoxy glycoluril, pigments, waxes, catalyst, flow aids, degassing agents and gloss modifiers may be included in the additive.

Further reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Reference will now be made in detail to exemplary embodiments of the present invention. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination. As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As noted above, the inventors endeavored to create a multi-functional additive which could simultaneously address the issues noted above, while also delivering added benefits to the powder and/or liquid coating compositions to which it might be added. These added benefits could include lower viscosity during the fusion process, improved mar and scratch resistance for the final fused/cured coating, improved performance on gloss and DOI testing.

The additive disclosed herein is particularly advantageous because in addition to being effective as a mar/scratch resistance additive it can be effective in improving surface tension, flow and weathering resistance—which in turn results in an improved shelf life system. It has now been discovered that a combination of polyester resin and acrylic resin blended in conjunction with additional constituents such as polymeric curatives, degassing agents, blended and extruded as masterbatch and having introduced (3-aminoproply) trimethoxysilane and silica type carriers such as silicone dioxide at (45-55% active) reduces orange peel significantly. The silica carrier is used in an amount of about 0.5 to 5.0% by weight based the balance of the mar/scratch resistance additive composition being 100% as shown in the tables below.

In one embodiment the additive is introduced to platform coating systems in an amount of about 0.5%-1.5%. In accordance with one embodiment or implementation of the invention, conventional flow and leveling agents or additives such as modified polyacrylates are not necessary. For example, flow modifiers such as polyacrylates are polymers or copolymers of esters of methacrylic and acrylic acids, flows aids and leveling agents such as Resiflow P-67 (Estron Chemical), Resiflow P-1200 (Estron Chemical), Resiflow P-65, (Estron Chemical), Oxymelt A-2 (Estron Chemical), Modaflow 2000 (Allnex), and X-22 from Monsanto are not required.

Representative examples of polyester hydroxyl resin useful in one embodiment include: Crylcoat 2401-2, Crylcoat 2471-4 (from Allnex) SP-100, SP-400 (from Sun Polymers) and Rucote 102, 108, and Rucote 121 (Stepan Company).

Representative curatives useful in one embodiment include, Crelan NI2 blocked cycloaliphatic polyisocynate, Dow Chemical TGIC, (triglycidyllisocyanurate), Epikure 101 Imidazole Adduct, Epikure P-108 DICY Imidazole Adduct, aliphatic and cycloaliphatic amine curing agent from Momentive Industries and phenolic hardener DEH84 from Dow Chemical.

While not necessary to the underlying efficacy of the additive, it may also be possible to include one or more flow aids, such as PF45 sold by Pison Stream Solutions, as disclosed in Table 1b below. Additional or alternative aids of this nature are disclosed in U.S. Pat. No. 9,353,254, (which is incorporated by reference herein).

One of the advantages of the mar/scratch resistance additive, at least in comparison to other coating additives, is that it may be inserted directly into a smooth texture coating platform binder system such as polyurethane, hybrid, TGIC, and Primid™ systems (manufacturers include EMS, Sun Polymer, Kukdo, Seoul, South Korea and Dow Industries). For epoxy system platforms Kukdo Epoxy Resins KD-211E, KD-211G, KD-242G, KD-243C and Dow's D.E.R 633U and Vantico GT7013 epoxy resin at about 0.5% up to about 4.0% by weight of total binder. In addition this mar/scratch resistant additive can also be post added/blended at about 0.03% up to about 0.9% by weight to act as an extender to current additives for mar/scratch resistance in formulation. The additive can be added to liquid as well as powder formulations. The formulation may be combined with liquids such as water (preferably de-ionized and/or distilled), acetone, methyl-ethyl ketone (butanone), ethanol, and other, similar common industrial solvents, as well as combinations thereof.

Typically, about 0.5% to about 1.5% by weight of a finished powder coating platform will be comprised by the additive. Unless otherwise stated, all percentages stated herein are weight percentages based on the total powder coating composition or, in the context of the mar/scratch resistant additive component itself, the composition of the modifier.

Coating platforms containing the additive component are preferably added to a conventional thermosetting powder coating resin material. The material is selected from one more of the groups of epoxy, epoxy-polyester, hydroxyl polyester, acrylic, TGIC polyester, and TGIC-free polyester resins, as well as combinations thereof. Conventional additives, such as hardeners, tetramethoxy glycoluril, pigments, waxes, catalysts, flow aids, degassing agents and gloss modifiers may be included, although many of these additives will be unnecessary in view of the additive's capabilities.

Representative and suitable epoxy resins include Kukdo Epoxy resin KD-242H. KD-242H, which are is bisphenol-A type solid epoxy resin which have excellent flow characteristics. KD-242H has an epoxy equivalent weight specification of 660-720 (g/eq), a softening point of about 85 to 95° C., and a melt viscosity of specification of about 2200 to 2800 cps at 150° C. Suitable hardeners include Kukdo KD-410J, Epikure 101 and Dyhard 100.

Dow Chemical's D.E.R 663U is a solid epoxy resin and is a standard medium molecular weight epoxy resin for powder coatings application. The resin has an epoxy equivalent weight specification of 730-820 (g/eg), a softening point specification of 92-102 C. and a melt viscosity specification of 2000-4000 cps at 150° C. Suitable hardeners include Kukdo KD-401, KD-41, KD-410J, Epikure 101 and Dyhard 100.

Representative examples of epoxy-polyester resins useful in one embodiment include: Crylcoat 2401-2, Crylcoat 2471-4 from Allnex; SP-100, SP-400 from Sun Polymers; and Rucote 102, 106, and Rucote 118 from Stepan Company. The table below shows one example of a mar/scratch resistant additive formulation in accordance with one embodiment of the invention (column 2) and approximated weight ranges covering other embodiments of the invention.

Tables 1a and 1b below provide general and specific details on the composition and manufacture of certain embodiments of the mar/scratch resistant additive. As noted above, this additive possesses significant advantages in comparison to conventional mar/scratch resistance solutions now available.

Notably, the precursor contemplated in Table 1a is first mixed and extruded. In doing so, the end product may be provided as extrudate flakes. The size and shape of these flakes will be dependent upon the extruder itself, but they should be sufficient to mix with the additional components of Table 1b prior to extruding the mar and scratch additive. Nevertheless, further processing of the flakes, such as by grinding into particles (similar to what may be done with the final product), is possible. Thus, the precursor may have a flake size of anywhere from 0.5 to 15 cm, with this dimension measured along the plane of the flake (whereas the thickness of the flake will be approaching an order of magnitude or more smaller). If subjected to grinding, the particles may be ground as small as a typical extruded product (i.e., 20, 30, 40, or 50 micrometers, either on average or as bounded on the lower and upper end by two of those numbers). In general, flake is a well understood concept within the powder coating extrusion field.

TABLE 1a

Masterbatch precursor.

| Exemplary Weight (g) | Min/max range, wt. %* | Component | Examples and characteristics |
|---|---|---|---|
| 600 | 55.0 to 65.0 | Polyester resin | Viscosity of 20-45 PS @ 200° C. and $T_g$ of 62-68° C.; SP-033 and SP-7700 from Sun Polymers or Crylcoat 4488-0 from Allnex |
| 50 | 3.0 to 7.0 | Acrylic resin 1 | Viscosity of 5-25 PS @ 200° C., equivalent weight of 300-350, and $T_g$ of 42-52° C.; AH1250 from Sun Polymers, Joncryl 587 hydroxyl resin from BASF, or GMA-300 from Estron |
| 150 | 10.0 to 20.0 | Acrylic resin 2 | Viscosity of 15-40 PS @ 200° C. and $T_g$ of 62-68° C.; Joncryl 587 hydroxyl resin from BASF or Isocryl 550 from Estron |
| 100 | 5.0 to 15.0 | Low gloss agent | Provided as a polyester or other similar resins having viscosity of about 25 PS (+/−5) @ 200° C., $T_g$ of 52-58° C., and acid value of 8 mg KOH/g (+/−2); Rucote 109 and Rucote 117 from Stepan |
| 40 | 2.5 to 5.5 | Hardener | Block aliphatic, cycloaliphatic, and/or aromatic polyisocyanates with equivalent |

TABLE 1a-continued

Masterbatch precursor.

| Exemplary Weight (g) | Min/max range, wt. %* | Component | Examples and characteristics |
|---|---|---|---|
| | | | weight 270-290 and $T_g$ of 52-63° C.; triglycidylisocyanurate (TGIC), Crelan Nl2 from Covestro, Alcure 4400, 4402, and 4450 from Polynt |

Processing notes: At ambient temperature and pressure, components above are admixed with a tumbler for 40-55 minutes or high speed mixer for 45-50 seconds until fully blended. The blended material is placed in the extruder hopper via the screw mechanism to the extruder dye, preferably with three temperature zones. The zone settings may be, respectively 60/60/100° C. The blended constituents are extruded at 300 RPM and at a feed rate of 400 g/min to form extruded flakes. Further grinding of the flakes is possible but not required.
*Stated weight ranges are calculated with respect to the final additive (i.e., accounting for components in both Tables 1a and 1b).

TABLE 1b

Components extruded with masterbatch precursor to create the final additive.

| Exemplary Weight (g) | Min/max range, wt. %* | Component | Examples and characteristics |
|---|---|---|---|
| 2 | 0.01 to 0.5 | Catalyst | Any one or combination of: stannous octoate catalyst, 65% 2-methyl imidazole, 65% 2-propyl imidazole, 60% active dibutyl tin dilauratel; Octaflow ST-70 stannous octoate catalyst from Estron, Actiron NXJ70 P from Proxchem Inc, Curaid 2PI-P, Curaid 2MI-P from Danick Specialties |
| 10 | 0.5 to 1.5 | Flow modifier | Resiflow P-67 from Estron Chemical, Resiflow P-65, Resiflow P-1200, Oxymelt A-2 from Estron Chemical, PF45 from Pison Stream Solutions, Modaflow 2000 from Allnex, and X-22 from Monsanto |
| 10 | 0.5 to 1.5 | Curative | Block aliphatic, cycloaliphatic, and/or aromatic polyisocyanates with equivalent weight 270-290 and $T_g$ of 52-63° C.; triglycidylisocyanurate (TGIC), Crelan Nl2 from Covestro, Alcure 4400, 4402, and 4450 from Polynt |
| 10 | 0.5 to 1.5 | Degassing agent | Surfactant/degasser with viscosity of 15-20 mPas @ 55° C. and freezing range of 53-56° C., such as Surfynol 104S from Evonik, Benzoin from Estron, or CM500W from ZCP |
| 12 | 0 to 1.5 | Antioxidant | Phenolic and similar type antioxidants with a density of 1.13-1.17 g/ml @ 20° C. and a melting range of 105-130° C.; IRG1010 from BASF and Evernox 10, Evernox 76 antioxidant from Everspring Chemical |
| 10 | 0 to 1.5 | UV inhibitors | Preferably a 50/50 split between (a) butylmalonate or sebacate having a molecular weight of 650-725 and melting range of 142-154° C. such as Tinuvin 144 from BASF, Chiguard 100G from Chitec, or Chisorb 292 from Cary and (b) triazin-based phenol having a molecular weight of 550-625 and melting range of 70-80° C., such as Tinuvin 405 from BASF |
| 5 | 0 to 1.5 | Anti-corrosion pigment | Zinc phosphate with density of 3.0 to 4.0 g/mL, pH of 6.7 to 7.2, and oil absorption of 20-25 cm³/g; Phosphinox PZ06 from SNCZ or HABICOR 3850 and 3860 from Habich |

Processing notes: Mix and extrude masterbatch precursor from Table 1a with components above. Mixing and extrusion according to the same conditions as identified in Table 1a. Preferred, final particle size for extruded additive is less than 50 μm, with ranges between 20 to 40 μm preferred in some embodiments and micronized sizes of 100 nm to 5 μm for other embodiments. If micronized (i.e., reduced to ≤5 μm particles), a Henschel high speed system can be used to blend the powder for micronizing.
*Stated weight ranges are calculated with respect to the final additive (i.e., accounting for components in both Tables 1a and 1b).
Items identified as 0 wt. % are optional, although the exemplary amounts represent a preferred embodiment.

The formulations contemplated by Tables 1a and 1b encompass any combination of values selected from each of the stated ranges. Any of these combinations can be extruded, ground to an optimized particle size (e.g., 100 nanometers to 5 micrometers), and adhered to a silica carrier such as (3-aminopropyl) trimethoxysilane and/or a silicone dioxide-precipitated amorphous silicate (45-55% active).

In a first embodiment, a coating composition having any combination of the following elements is contemplated:
a mar and scratch resistant additive consisting essentially of: 75.5 to 98.5 wt. % of a masterbatch precursor extruded with additional components as a remainder;
a film-forming composition including at least one resin;
wherein the masterbatch precursor is formed prior to extruding the additional components and consists essentially of a polyester resin, acrylic resins, a low gloss resin, and a hardener and wherein the additional components form a remainder of mass provided to the mar and scratch resistant additive, said additional components including a degassing agent, a flow modifier, a catalyst, and curative;
wherein the mar and scratch resistant additive is 0.06 to 1.50 wt. % of the chemical coating composition;
wherein the film-forming composition includes at least one additive selected from: 12-hydroxy-9-cis-octadecenoic acid, glass flakes, tetramethoxy glycoluril, pigments, waxes, hardening catalysts, and any combination of two or more thereof;

wherein the film-forming composition forms a fusion powder coating film when the chemical coating composition is cured;

wherein the film-forming composition is provided to a liquid carrier, said liquid carrier being removed when the chemical coating composition is cured;

wherein the mar and scratch resistant additive is provided on a silica carrier;

wherein a relative weight ratio of mar and scratch resistant additive to silica carrier is between 60:40 and 70:30;

wherein the silica carrier is selected from (3-aminopropyl) trimethoxysilane, silicon dioxide, and combinations thereof;

wherein the mar and scratch resistant additive is provided as particles each having a size of less than 5 micrometers wherein the film forming composition is provided as particles each having a size of greater than 20 micrometers;

wherein substantially all of the particles of mar and scratch resistant additive are greater than 100 nanometers and substantially all of the particles of finished coating resin(s) are between 20 and 40 micrometers;

wherein the masterbatch precursor is provided as flakes before the masterbatch precursor is extruded with the additional components;

wherein the additional components also include at least one of: an anti-corrosion additive, an anti-oxidant, and at least one ultraviolet inhibitor;

wherein, relative to a total weight of the mar and scratch resistant additive, the polyester resin is provided at 55.0 to 65.0 wt. %, the acrylic resins are provided at 13.0 to 27.0 wt. %, the low gloss resin is provided at 5.0 to 15.0 wt. %, the hardener is provided at 2.5 to 5.5 wt. % and each of the additional components is provided at less than 1.5 wt. %;

wherein the acrylic resin consists essentially of a first acrylic component having a Tg between 42-52° C. and a second acrylic component having a Tg between 62-68° C.;

wherein, relative to the total weight of the mar and scratch resistant additive, the first acrylic component is provided at 3.0 to 7.0 wt. % and the second acrylic component is provided at 10.0 to 20.0 wt. %;

wherein, relative to the total weight of the mar and scratch resistant additive, the catalyst is provided at between 0.01 and 0.5 wt. %;

wherein the catalyst is at least one selected from stannous octoate, 2-methyl imidazole, 2-propyl imidazole, and dibutyl tin dilauratel;

wherein the finished coating resin(s) includes a thermosetting resin;

wherein the thermosetting resin is selected from the group consisting of epoxy resin, epoxy-polyester resin, acrylic resin, hydroxyl polyester resin, TGIC polyester, TGIC-free polyester resin, and any combination of two or more thereof;

wherein the thermosetting resin includes a TGIC polyester resin;

wherein the curative is a blocked cycloaliphatic, aliphatic or aromatic polyisocyanate; and wherein the hardener is a blocked cycloaliphatic, aliphatic or aromatic polyisocyanate.

In a separate embodiment, a mar and scratch resistant additive for use in a coating composition having any combination of the following elements is contemplated:

55.0 to 65.0 wt. % of a first polyester resin having a Tg between 62-68° C.;

3.0 to 7.0 wt. % of a first acrylic resin having a Tg between 42-52° C.;

10.0 to 20.0 wt. % of a second acrylic resin having a Tg between 62-68° C.;

5.0 to 15.0 wt. % of a second polyester resin having a Tg between 52-58° C.;

2.5 to 5.5 wt. % of a blocked aliphatic, cycloaliphatic, or aromatic polyisocyanate;

0.01 to 0.5 wt. % of a catalyst;

a remainder additive components including a flow modifier and a degassing agent, wherein each additive component comprises no more than 1.5 wt. %;

wherein the remainder additive components also include at least one selected from an anti-corrosion additive, an anti-oxidant, and an ultra-violet inhibitor;

wherein the ultraviolet inhibitor includes at least selected from a butylmalonate-based component, a sebacate-based component, and a triazin-based phenol component;

wherein the catalyst is at least one selected from stannous octoate, 2-methyl imidazole, 2-propyl imidazole, and dibutyl tin dilauratel;

wherein the additive is provided on a silica carrier;

wherein a relative weight ratio of the additive to the silica carrier is between 60:40 and 70:30;

wherein the silica carrier is selected from (3-aminopropyl) trimethoxysilane, silicon dioxide, and combinations thereof;

wherein the additive is formed as particles each having a size of less than 5 micrometers; and wherein the particles each have a size of greater than 100 nanometers.

In a further embodiment, a coating composition includes any combination of the following:

at least one finished coating component provided at a weight ratio of 98 parts or more of the finished coating component and between 0.05 to 2 parts of either the additive or the coating composition described in the preceding paragraphs;

wherein the finished coating component forms a fusion powder coating film when the composition is cured; and wherein the finished coating component includes a liquid carrier that is removed from a final, coating film when the composition is cured.

In yet another embodiment, a method for improving the mar and scratch resistance of a cured coating can include any combination of the following:

extruding a first admixture comprising a polyester resin, two distinct acrylic resins having different Tg temperature ranges, a low gloss resin, and a blocked aliphatic, cycloaliphatic or aromatic polyisocyanate to produce a masterbatch precursor;

mixing and extruding the masterbatch precursor with a second admixture comprising a catalyst, a flow modifier, a degassing agent, and a blocked aliphatic, cycloaliphatic or aromatic polyisocyanate to produce an additive precursor;

mixing the additive precursor with a silica carrier at a weight ratio of additive precursor to silica carrier between 60:40 and 70:30 to create a mar and scratch resistant additive;

providing the mar and scratch resistant additive to a chemical coating comprising at least one finishing resin to form a finished coating composition, wherein the additive component is provided at between 0.05 and 1.5 wt. % of the finished coating composition;

prior to mixing and extruding the additive precursor, grinding the masterbatch precursor; and wherein, prior to mixing the additive precursor with the silica carrier, the additive precursor is subjected to grinding until a particle size of between 100 nanometers and 5.0 micrometers.

The additive as disclosed herein delivers the following advantages in finished chemical coating compositions and also in comparison to currently available mar and scratch additives known to the inventors, including:

provides both mar/scratch resistance as well as reduces the coefficient of friction, with minimal loss of gloss, minimal haze formation and negligible impact on distinctness of image (DOI);

allows for high gloss retention and has a high yellowing resistance, therefore increasing shelf life;

improves surface tension in powder and liquid coating system platforms formed by coating compositions and constituents by aiding with creating a lower viscosity during endothermic reaction period;

extends durability and enhances weathering resistance under both real world and simulated testing;

improves mar and scratch resistance with standard powder coatings platforms such as TGIC, hybrid (polyester-epoxy combinations), and epoxy from 2B up to 4H pencil hardness following standard ASTM 3363 methods for Pencil Hardness test (with pencil hardness standard ranges are as follows: 6B, 5B, 4B, 3B, 2B, B, HB, F, H, SH, 3H, 4H, 5H, 6H); and chemical resistance to a host of reagents such as acetic acid, sulfuric acid, hydrochloric acid and acetic anhydride corrosive acids and bases such as sodium hydroxide (NaOH) and potassium hydroxide (KOH)—all of which may be key reagents used for obtaining certification in conventional finished coating platforms.

Further, it should be noted that while the additive disclosed herein nominally includes components that are common to conventional powder coatings (even to the point of creating a masterbatch as part of the formulation process), the ancillary components (i.e., the non-resin components, such as anti-corrosion pigments, curative/hardeners, degassing agents, anti-oxidants, and the like) are not necessarily selected so as to make the additive a viable, stand-alone finished coating composition in its own right. That is, while the additive appears to have the same items as a conventional, finished powder coating, whether the constituents of the additive could be useful as a coating is irrelevant.

Instead, the additive is specifically formulated to integrate with conventional finished coating compositions so as to deliver the desired effects with respect to scratch resistance, chemical resistance, gloss retention, and friction performance of the cured coating. This holistic approach to formulating an additive—by considering a combination of resins and ancillary components that deliver a synergistic effect—is, in the inventors' view, a stark departure from previous additives. Whereas legacy commercial additives have identified one or two chemicals as "active" or important contributors to the mar/scratch resistant additive's efficacy—with the additive itself then formulated to maximize the amount(s) of those active ingredients—the disclosed aspects of this invention acknowledge the significance of providing an entire binder system that itself melts and integrates with finished coating composition to which it is added and, eventually, cured.

Further, by relying on a silica carrier, the inventive additive can be integrated seamlessly during the curing process. That is, the micronized additive (i.e., particle sizes between 100 nanometers and 5 microns) can be introduced to the finished coating composition by way of an inert carrier that will simply become part of the final, cured coating. Further, by associating the additive with the silica carrier, storage and handling of the additive is simplified.

One aspect of the disclosed formulations is that the amounts of each additive component are selected relative to ratio of multi-functional additive/additive to silica carrier. That is, the additive adheres to the silica carrier in known amounts, so that the combination additive-carrier is provided to the finished coating composition at the relatively low weight percentages contemplated herein. Further, given the aforementioned synergistic effects of the constituents of the additive, the relative (or "stoichiometric") amounts of the constituents and silica carrier are important to the efficacy of the final additive. Preferably, the additive is provided at between 60 to 70 wt. %, with the remainder being provided as the silica carrier.

The final additive platform contemplated herein can be cured 10 min. @ 375° F. or 20 min. @ 350° F., using a convection oven such as laboratory oven (e.g., Blue M made in White Deer Pa.). The additive is then milled or ground to a particle size that is appropriate for powder coating applications, with micronized sizes being most ideal when a silica carrier is used. In this manner, as little as 0.5 to 15 grams of additive for mar/scratch resistance per 1000 grams of finished coating powder can be effective when blending a finished powder coating composition, post extrusion (of the finished coating composition), according to certain aspects of the invention. Alternatively, as noted above, 0.5 to 1.5 wt. % of the additive for mar/scratch resistance can be blended and extruded with/as part of the finished coating composition.

In identifying appropriate resins for the additive, alternatives can be identified so long as they have the same chemical composition and similar characteristics (e.g., viscosity, $T_g$ temperature, differential scanning calorimetry, etc.) as the exemplary grades of material identified herein.

Further, coating compositions having the additive can be applied on various substrate types such as plastic, metal, aluminum, wood, concrete, paper, cloth, stucco and a host of other materials to act as a coating. Additional, exemplary resins and additives, suitable for such coating compositions, as disclosed in any the references identified herein are also incorporated by reference. Still other components that may be mixed into or formed as part of the extruded powder.

Unless specifically noted, all tests and measurements are conducted in ambient conditions according to commonly accepted measurement protocols (e.g., such as those regularly published by ASTM International) and relying upon commercially available instruments according to the manufacturer-recommended operating procedures and conditions. Specific tests and regimens identified in the military and other specifications noted above may be particularly informative in characterizing the performance of coatings contemplated herein, including ASTM B117, D476 (type III or IV), D522, D523, D1849, D2794, D2805, D3271, D3335, D3359, D3363, D3451, D3723, D4060, D5767, D7027, D7187, E308, E1331, G90, G154, and G171. Unless noted to the contrary (explicitly or within the context of a given disclosure), all measurements are in grams and all percentages are based upon weight percentages.

Although the embodiments of this disclosure have been disclosed, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A mar and scratch resistant additive comprising:
   55.0 to 65.0 wt. % of a first polyester resin having a $T_g$ between 62-68° C.;
   3.0 to 7.0 wt. % of a first acrylic resin having a $T_g$ between 42-52° C.;
   10.0 to 20.0 wt. % of a second acrylic resin having a $T_g$ between 62-68° C.;
   5.0 to 15.0 wt. % of a second polyester resin having a $T_g$ between 52-58° C.;
   2.5 to 5.5 wt. % of a blocked aliphatic, cycloaliphatic, or aromatic polyisocyanate;
   0.01 to 0.5 wt. % of a catalyst; and
   a remainder additive components including a flow modifier and a degassing agent, wherein each additive component comprises no more than 1.5 wt. %.

2. The mar and scratch additive according to claim 1 wherein the remainder additive components also include at least one selected from an anti-corrosion additive, an anti-oxidant, and an ultra-violet inhibitor.

3. The mar and scratch additive according to claim 2 wherein the ultraviolet inhibitor includes at least selected from a butylmalonate-based component, a sebacate-based component, and a triazin-based phenol component.

4. The mar and scratch additive according to claim 1 wherein the catalyst is at least one selected from stannous octoate, 2-methyl imidazole, 2-propyl imidazole, and dibutyl tin dilauratel.

5. The mar and scratch additive according to claim 1 wherein the additive is provided on a silica carrier.

6. The mar and scratch additive according to claim 5 wherein a relative weight ratio of the additive to the silica carrier is between 60:40 and 70:30.

7. The mar and scratch additive according to claim 5 wherein the silica carrier is selected from (3-aminopropyl) trimethoxysilane, silicon dioxide, and combinations thereof.

8. The mar and scratch additive according to claim 5 wherein the additive is formed as particles each having a size of less than 5 micrometers.

9. The mar and scratch additive according to claim 8 wherein the particles each have a size of greater than 100 nanometers.

10. A chemical coating composition comprising at least one finished coating component provided at a weight ratio of 98 parts or more of the finished coating component and between 0.05 to 2 parts of the mar and scratch additive of claim 1.

11. The coating composition of claim 10 wherein the finished coating component forms a fusion powder coating film when the composition is cured.

12. The coating composition according to claim 10 wherein the finished coating component includes a liquid carrier that is removed from a final, coating film when the composition is cured.

* * * * *